Dec. 24, 1935.  A. H. OELKERS  2,025,342
TUBULAR AXLE AND ROLLER BEARING ASSEMBLY
Filed Aug. 8, 1927
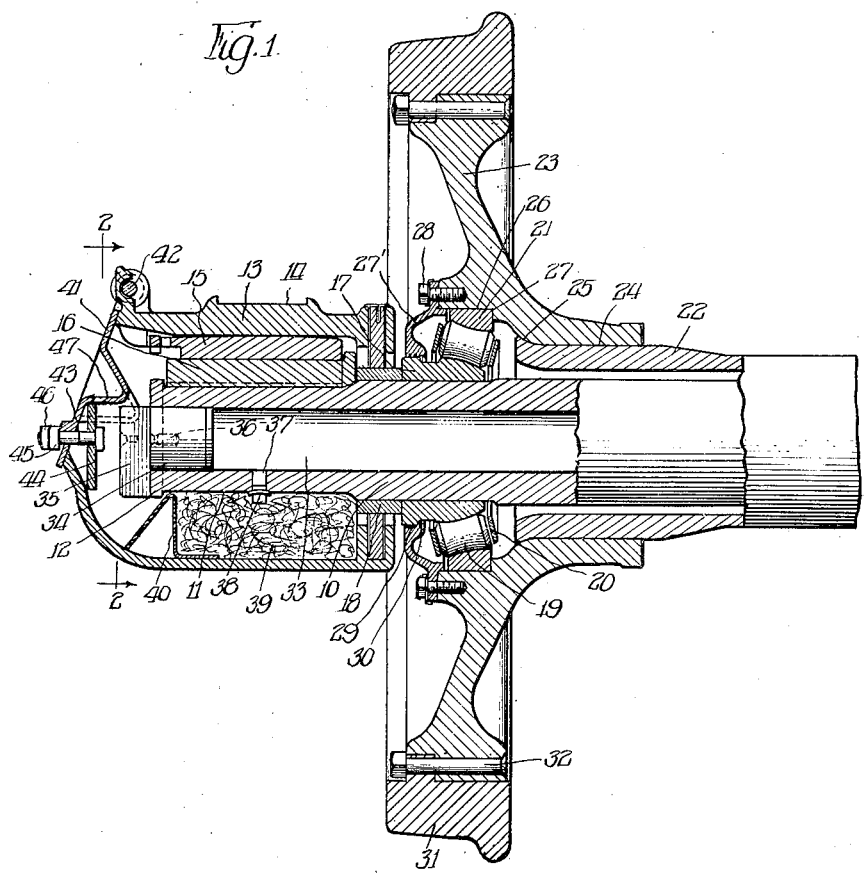
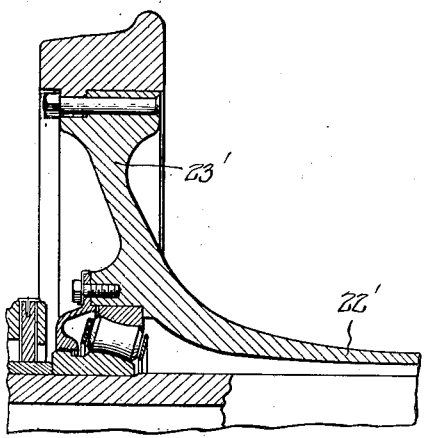
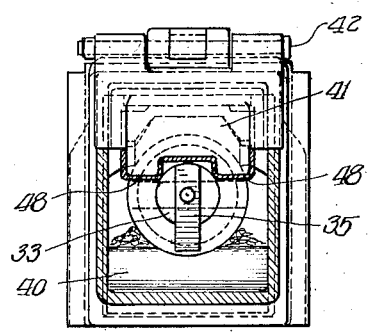
Witness:
R. Burkhardt.
Inventor:
Alfred H. Oelkers,
By Wilkinson, Huxley, Byron & Knight
Attys.

Patented Dec. 24, 1935

2,025,342

UNITED STATES PATENT OFFICE 2,025,342

TUBULAR AXLE AND ROLLER BEARING ASSEMBLY

Alfred H. Oelkers, Chicago, Ill., assignor to American Steel Foundries, Chicago, Ill., a corporation of New Jersey Application August 8, 1927, Serial No. 211,385

15 Claims. (Cl. 295—36)

This invention relates to improved railway car trucks, and particularly to wheel and axle assemblies of the type employing anti-friction bearings.

My invention embodies a normally stationary inner axle having its outer ends constructed to be received by the ordinary standard A. R. A. journal brasses and in this manner to support the weight of the truck, the inner axle being further constructed at each end with an inner race ring and anti-friction bearings which support an outer rotating tubular axle and wheel construction. The wheels may be made either integrally with the outer rotating tubular axle or as separate members fixed to the ends thereof and adapted to rotate therewith.

The main object of my invention is to provide in a structure of this type, means for permitting, under predetermined conditions, a partial rotation of the inner normally stationary axle together with the inner race ring of the bearing for the purpose of distributing the wear of the inner race ring as occasioned by the operation of the device under load.

It is another object of my invention to provide for the partial movement of the inner axle and race ring by means operable when the car starts in motion in a direction opposite to that in which it was last moving.

A further object is to provide wheel and axle assemblies having cooperating bearings so disposed and formed that any distortion of the assembly will not affect the alignment of the bearings.

With these and various other objects in view, the invention consists of certain novel features of construction and operation as will be more fully described and particularly pointed out in the specification, drawing and claims appended hereto.

My invention is an improvement on the devices disclosed in my co-pending applications, Serial No. 182,734 filed April 11, 1927 on Anti-friction wheel and axle construction, and Serial No. 184,469 filed April 18, 1927 for a Wheel and axle assembly.

In the drawing, wherein like reference characters are used to designate like parts—

Figure 1 is a transverse fragmentary sectional elevation of one end of a wheel and axle assembly constructed in accordance with my invention;

Figure 2 is a sectional view of one end of the axle and journal box constructed in accordance with my invention and taken substantially on the plane as indicated by the line 2—2 of Figure 1; and Figure 3 is a fragmentary sectional view of a modified form of my invention.

Inasmuch as the two ends of the axle assembly are similar for the purpose of illustration, only one end is disclosed in the drawing and described in the specification.

Referring to the drawing, it will be noted that the modified form of my invention as shown in Figure 1 embodies a normally stationary inner axle 10 having a reduced end portion 11 and outer flange 12 which constitutes a supporting end of a structure similar to the standard A. R. A. journal axle and is accordingly one which is capable of being mounted in the customary journal boxes in engagement with the standard A. R. A. journal brasses.

The end of the axle projects into the journal box 13 having a slot 14 on which the customary means are positioned for supporting the truck on the wheel and axle assembly. The journal box is positioned to rest on the axle and is supported by the wedge member 15 and a journal brass 16. These elements are constructed in a manner to support radial loads and to impart axle thrusts from the car truck to the wheel and axle assembly. The means for accomplishing this function, however, constitutes no part of the present invention and are similar in construction and operation to the corresponding parts of the device disclosed in my co-pending application Serial No. 182,734, above referred to, and in view of the fact that these parts are fully described in the co-pending application above referred to, it is deemed to be unnecessary to describe them in detail here.

Mounted on the stationary axle by shrinking or by a pressed fit is the inner race ring 17 held in place by the collar 18 which also is shrunk or mounted with a pressed fit on the axle. Anti-friction roller bearings 19 held circumferentially spaced by the cage 20 are mounted on the inner race ring and have the outer race ring 21 in bearing engagement with their outer surfaces. Surrounding and spaced from the intermediate portion of the stationary axle is the rotating tubular axle 22 which has wheel hub portions 23 mounted on its flanged ends 25 and operatively connected thereto by means of a pressed fit as at 24. The outer race ring 21 has a pressed fit in the cup-shaped opening 26 provided in the wheel hubs so that the inner end abuts the shoulder 27 whereby the race ring is held against inward movement. Surrounding the bearing opening and inserted in the nature of a dust guard and cover plate is the annular cover or plate 27' held against the wheel hub portion by means such as bolts 28 and having an inner portion 29 closely surrounding the inner race ring in a manner to substantially close the space therebetween, but to permit relative rotation between these parts. The inwardly projecting portion 29 is provided on its inner cylindrical face with a plurality of circumferential grooves 30 which act in the capacity of oil catching grooves whereby leakage of lubricant through this opening is prevented. The wheel hub portions 23 are provided with wheel rims 31 which are preferably made separate and are held fixed to the hub portion by means such as bolts 32 or rivets or by any other suitable means. This construction in some instances is considered more desirable than making the rim and wheel hub portions integral in view of the fact that this arrangement is easier to manufacture, makes for cheaper repairs and permits a selection of different metals for the two portions of the wheel.

The bearings are of a self-aligning type where deflection of the axle under the application of load on its ends is provided for; that is, the various parts of the bearings, as the races and rollers, may include cooperating spherical elements, preferably providing a line contact as distinguished from a point contact. The bearing is also capable of adjustment, as at the time of initial mounting or when compensating for wear, by moving the inner race ring in the inner axle. The holding collar 18 may be reset to maintain the bearing in its new position. The inward movement of the inner race ring tightens the bearing due to the angular disposition of the rollers. With this type of bearing then, the alignment is accomplished where it is most needed and is most effective. As will be clearly recognized, there is self-alignment at the anti-friction surfaces where it can be accomplished with little or no resistance from the parts or wear on these parts. At these surfaces too, provision is made through the proper disposition of the parts as explained, for taking up any wear in the parts. Then too, this type of bearing is most effective in allowing expansion between the parts. As will be appreciated, there is little or no expansion of the outer rotary axle, due to its rotation and passage through the air dissipating the work heat. But the inner axle, due to its confinement, does elongate in operation and bearings capable of even 3/1000 inches variance bind. It is therefore necessary to provide bearings, as in the instant case, capable of operating under 8/1000 inches variance and free to have outward expansion under the conditions of elongation of the inner axle.

Attention is directed to the fact that the inner stationary axle is hollow whereby a chamber 33 is provided which extends to the outer end, the outer end being closed by a plug 34 having an eccentric lug 35 projecting therefrom in the manner disclosed in Figure 1. It will readily be apprceiated that an eccentric mounted lug may be formed of a lug concentrically mounted with respect to the axis of the shaft but so proportioned that the legs of the lug, measured from the axis along the major axis of the lug, are of unequal length. The shorter leg is so proportioned that when rotation of the axle is effected, this leg will never contact the lug 48, but the longer lug has contact with said lug 48; in other words, the axle is capable of a substantial 180° movement. The plug is held fixed in the end of the axle and against rotation by means of a dowel 36 or any other suitable device so that the plug is so held relative to the inner axle that the projecting lug 35 may cooperate with a projecting means on the journal box lid hereinafter described for the purpose of maintaining the inner axle against rotation in excess of a predetermined amount. The bearing portion 11 of the end of the inner axle is provided with an opening 37 which is closed by a plug 38 constructed of a soft substance, preferably of metal, which is capable of being sheared off to open the communication between the inner axle and the journal box if and when the inner axle rotates an extent sufficient to bring the plug into engagement with the edge of the journal brass. The bottom of the journal box is provided with a quantity of waste material and a waste guard 40, the material being normally dry and free of lubricant.

The journal box lid 41 is pivoted at the top on a pivot bar 42 and is held shut in normal operation by means of the bolt 43 and plate 44, the latter being positioned inside of the journal box. The bolt has a nut 45 and lock nut 46 positioned on its outer end in a manner readily accessible to the car inspectors or railway employees attending to the car lubrication. The journal box lid is constructed with an inwardly projecting substantially bifurcated lug 47 having portions 48 at either side adapted to contact the lug 35 held fixed with the inner axle in a manner to arrest rotation thereof. The general constructions of the outer axle lug and cooperating lugs on the journal box lid, with the exception that the lugs in this instance are of a slightly modified form, are similar to those disclosed in my copending application Serial No. 184,469 above referred to.

In operation, the load of the car is supported on the normally stationary axle and the rotation occurs at the anti-friction bearing when the wheel and tubular axle rotate therearound as when the car is in motion. When such is the case, the lubricant for the anti-friction bearing is contained in the space provided between the inner stationary axle and the outer rotating axle, it being introduced through a suitable opening and no lubrication is required in the journal box due to the fact that there is usually no rotation or moving bearing support between the journal box brass and the end of the inner axle. However, it is sometimes found that the anti-friction bearings freeze or fail in some manner whereby the wheel and outer tubular axle are fixed relative to the inner stationary axle, these parts then rotating together as a unit. When this occurs, the journal box lid is either broken or forced open by the continued movement of the car whereby the holding lugs 48 on the journal box lid cease to engage and hold the lugs 35 on the end of the axle, and consequently the inner axle is permitted to rotate and to serve by its bearing engagement with the supporting brass 16 as the bearing for the assembly. Normally the axle is held when the anti-friction bearing is functioning properly so that the plug 38 is kept away from the journal brass, but when the inner axle is forced to rotate, the plug is sheared off so that the oil contained within the inner axle saturates the waste and provides the necessary lubricant at the time the journal bearing is brought into operation.

The particular feature of the present invention resides in the construction of the lug 35 which is constructed as a projecting fin positioned on the diameter of the axle end. Attention is directed to the fact that the lug is eccentric, having one side longer than the other, and as shown in Figure 2, the short side does not contact the holding lugs 48 on the journal box lid, but the other or long side will be arrested by either one of the two lugs 48, depending upon the direction of rotation of the car.

In practice, even though the anti-friction bearing functions properly, it has been found that a slight creeping of the inner axle is effected whereby it will rotate unless positively held, and the discovery of this fact is a reason why the lugs were provided on the axle and journal box lid in the construction shown in my copending application, Serial No. 184,469, for holding the inner axle absolutely stationary. By the special construction of the lug 35 in the present invention, whereby it will cooperate with the opposite lugs 48 on the lid at diametrically opposite positions in a manner to permit a partial rotation of the inner axle, the creeping of the inner axle is taken advantage of so that when the car reverses its movement and direction of rotation, the inner axle is permitted to assume positions by a slow creeping movement diametrically opposite each other. This makes for an improvement, in that the wear of the inner race ring is distributed over an increased surface, whereby the construction has a considerably longer life. In addition to this, the dowel 36 may be removed and a plug reset in any new position in the axle whereby a new surface of the inner race ring may be presented to receive the wear and in this manner the inner race ring can be caused to wear uniformly throughout its entire surface.

One of the special features of my invention also resides in the provision of aligned bearings in a construction of this character, whereby deflection of the axle by the location of the load at the outer end is compensated for. The modification of my invention shown in Figure 3 is substantially similar to that shown in Figure 1, with the exception that the outer tubular axle 22' and the wheel hub portion 23' are made as an integral structure rather than in two pieces as above described. This construction is found to be desirable in some uses, particularly as in mine car construction, dump car construction, etc.

In normal operation, when a car is running in one direction, the inner axle will creep in the opposite direction of rotation of the outer axle and wheel until it is stopped by the lug 48 which engages the lug 35. Upon the reversal of the movement of the car, the lug will permit the inner axle to creep to the diametrically opposite position during such movement and to present a new bearing surface of the inner race ring at the location where the greatest wear occurs. During this operation, the journal box is dry and the anti-friction bearing is supplied with lubricant contained in the space between the inner and outer axle. If in the event of failure of the anti-friction bearings the inner axle is held rigid with the wheels, the lug 35 in engagement with the lug 48 on the lid will force the lid open or break the lid by the forced rotation of the axle. The inner axle will rotate, the plug 38 will be sheared off and lubricant will be supplied to the journal box waste and to the journal bearing. By the forcing of the lid to an open position or by breaking the lid, an indication is given to the car inspector that the anti-friction bearing is not functioning and in which case, the car can be repaired when convenient but is capable of operation with the journal bearing for a temporary period. The journal box lid is constructed to be broken or forced open by the application of the force occasioned when the inner axle rotates. By keeping the inside of the journal box free of lubricant during the normal operation of the car, the parts are kept clean and free of grit and dirt, whereby undue wear is eliminated.

It will further be appreciated that due to the type of bearing employed, there will be little or no liability of excessive wear or breaking of the parts through unfair use. As is well known, cars are often unequally loaded so that slight deflection of the axles may occur. Also it will be seen that when the lug 35 cooperates with the shelf or lug 47, distortion of the axles may occur. This distortion causes excessive wear and sometimes destruction of the associated parts due to the misalignment of the bearings. But with the assembly herein disclosed, such dangers are eliminated. The shape of the parts of the bearings, being preferably sphere elements, is such that should any distortion of the axles occur, positions of parts of the bearing will merely change, keeping the bearing at all times aligned, and it will be noted that such change in the bearing parts in no way affects the contacts of such parts.

It is to be understood that I do not wish to be limited by the exact embodiments shown, which are by way of illustration and not limitation, as other and various embodiments will of course be apparent to those skilled in the art.

I claim:

1. In a device of the character described, the combination of a pair of interfitting cooperating wheel supported axles, journal boxes and bearings cooperating with said device, a bifurcated lug mounted on at least one of said journal boxes, and a lug mounted on one of said axles and provided with unequal legs, one of said legs cooperating with said bifurcated lug to permit limited rotation of said axle.

2. In a device of the character described, the combination of a pair of interfitting cooperating wheel supported axles, journal boxes and bearings cooperating with said device, a bifurcated lug mounted on at least one of said journal boxes, and a lug mounted on the inner of said axles and provided with unequal legs, one of said legs cooperating with said bifurcated lug to permit limited rotation of said axle.

3. In a wheel and axle assembly, the combination of a rotary axle having wheels disposed thereon, each of said wheels having an inwardly projecting hub portion provided with a bore for engagement with said axle, said axle having an enlarged hub engaging portion of greater diameter than the diameter of the bore of said first named hub portion and terminating in flanged ends within the bore of said wheels.

4. In a wheel and axle assembly, the combination of a rotary axle having wheels disposed thereon, each of said wheels having a recess disposed therein and each having an inwardly projecting hub portion provided with a bore for engagement with said axle, said axle having an enlarged hub engaging portion extending into said recess and being of greater diameter than the diameter of the bore of said first named hub portion and terminating in flanged ends within the bore of said wheels.

5. In a railway car truck, a tubular member, a wheel having a hub portion rigidly secured upon said tubular member at each end thereof by a press fit, said hub portions of the wheels extending outwardly beyond the ends of said tubular member, an axle extending through said tubular member and through the outwardly extending hub portions of the wheels, and anti-friction bearings interposed between the wheels and said axle, said bearings being positioned beyond the ends of said tubular member.

6. An axle member for a wheel and axle assembly including a hollow axle flared at an end thereof and having a wheel diaphragm disposed substantially radially thereof adjacent said flared portion, the flared portion merging into a portion adapted to accommodate a bearing.

7. An axle member for a wheel and axle assembly including a hollow axle flared at an end thereof and having a wheel diaphragm disposed substantially radially thereof adjacent said flared portion, said diaphragm having a portion for accommodating a wheel tire, the flared portion merging into a portion adapted to accommodate a bearing.

8. In a wheel and axle assembly, the combination of an axle, wheels cooperating therewith, a journal box for receiving an end of said axle, a lug disposed on said axle and a cover for said journal box, said cover being provided with inwardly extending stepped axle lug cooperating means for permitting movement of substantiallly 180° of said axle.

9. In combination, an axle normally limited to less than a complete rotation and having a race-ring mounted thereon, load carrying means, means mounted on said load carrying means supporting said load carrying means on an end of said axle, said supporting means being provided with a bearing for a greater rotation of said axle, means on said load supporting means displaceable by said axle upon rotation thereof under abnormal force to indicate said greater rotation, said means being operable only after a limited amount of rotation of said axle from its normal operating position, said limited amount of rotation serving to provide separate load carrying surfaces on the race-ring for the rollers mounted thereon.

10. In combination, an axle normally limited to less than a complete rotation and having a race-ring mounted thereon, load carrying means, means mounted on said load carrying means supporting said load carrying means on an end of said axle, said supporting means being provided with a bearing for a greater rotation of said axle, means on said load supporting means displaceable by said axle upon rotation thereof under abnormal force to indicate said greater rotation, said last-named means being operable to limit said normal rotation, and said normal rotation being sufficient to provide separate load carrying surfaces on said race-ring for the rollers mounted thereon.

11. In combination, an axle normally limited to less than a complete rotation and having a race-ring mounted thereon, load carrying means, means mounted on said load carrying means supporting said load carrying means on an end of said axle, said supporting means being provided with a bearing for a greater rotation of said axle, means on said load supporting means cooperating with said axle to limit said normal rotation of said axle, and said normal rotation being sufficient to provide separate load carrying surfaces on said race-ring for the rollers mounted thereon.

12. In combination, an axle normally limited to less than a complete rotation and having a race-ring mounted thereon, load carrying means, means mounted on said load carrying means supporting said load carrying means on an end of said axle, said supporting means being provided with a bearing for a greater rotation of said axle, means on said load supporting means cooperating with means on said axle to limit said normal rotation of said axle, and said normal rotation being sufficient to provide separate load carrying surfaces on said race-ring for the rollers mounted thereon, said means on said axle being adjustable whereby new load carrying surfaces are presented to said rollers.

13. In combination, an axle normally limited to less than a complete rotation and having a race-ring mounted thereon, load carrying means having a journal box for supporting said load carrying means on an end of said axle, said journal box being provided with a bearing for a greater rotation of said axle, a closure member movably mounted on said journal box and cooperating with said axle to limit said normal rotation and being displaceable by said axle uopn rotation thereof under abnormal force to indicate said greater rotation, and said normal rotation being sufficient to provide separate load carrying surfaces on said race-ring for the rollers mounted thereon.

14. In combination, an axle normally limited to less than a complete rotation and having a race-ring mounted thereon, load carrying means having a journal box for supporting said load carrying means on an end of said axle, said journal box being provided with a bearing for a greater rotation of said axle, a closure member movably mounted on said journal box and cooperating with said axle to limit said normal rotation, and said normal rotation being sufficient to provide separate load carrying surfaces on said race-ring for the rollers mounted thereon.

15. In combination, an axle normally limited to less than a complete rotation and having a race-ring mounted thereon, load carrying means having a journal box for supporting said load carrying means on an end of said axle, said journal box being provided with a bearing for a greater rotation of said axle, a closure member movably mounted on said journal box, said closure member and axle having cooperating lugs to limit said normal rotation, and said normal rotation being sufficient to provide separate load carrying surfaces on said race-ring for the rollers mounted thereon, the lug on said axle being adjustable whereby new load carrying surfaces are presented to said rollers.

ALFRED H. OELKERS.